United States Patent
Bakker et al.

(10) Patent No.: US 10,962,135 B2
(45) Date of Patent: Mar. 30, 2021

(54) SOLENOID VALVE WITH MANUAL OVERRIDE FUNCTIONALITY THAT HAS COOPERATING LATCH AND RELEASE HANDLES

(71) Applicant: Asco Controls B.V., Ede (NL)

(72) Inventors: Henk Bakker, Driel (NL); Erik Kooijman, Arnhem (NL); Bert van de Kamp, Barneveld (NL)

(73) Assignee: Asco Controls B.V., Ede (NL)

( * ) Notice: Subject to any disclaimer, the term of this patent is extended or adjusted under 35 U.S.C. 154(b) by 0 days.

(21) Appl. No.: 16/373,756

(22) Filed: Apr. 3, 2019

(65) Prior Publication Data
US 2019/0309869 A1 Oct. 10, 2019

(30) Foreign Application Priority Data
Apr. 5, 2018 (NL) .................................. 2020721

(51) Int. Cl.
*F16K 31/06* (2006.01)
*F16K 31/60* (2006.01)
(Continued)

(52) U.S. Cl.
CPC ...... *F16K 31/0693* (2013.01); *F16K 31/0627* (2013.01); *F16K 31/602* (2013.01); *F16K 35/025* (2013.01); *A62C 35/68* (2013.01)

(58) Field of Classification Search
CPC ............... F16K 31/6293; F16K 31/602; F16K 31/0627; F16K 35/025; A62C 35/68
See application file for complete search history.

(56) References Cited

U.S. PATENT DOCUMENTS 3,351,093 A * 11/1967 Frantz ................. F16K 31/0627
137/625.27
4,501,299 A * 2/1985 Klimowicz ......... F16K 31/0606
137/625.5
(Continued)

FOREIGN PATENT DOCUMENTS

WO 2013/176547 A1 11/2013

OTHER PUBLICATIONS

IMI MAXSEAL ICO4S, 2/2, 3/2 or 5/2 poppet valves electromagnetic actuated, directly controlled, IMI Precision Engineering, Dec. 17, 2015, 12 pages.
(Continued)

*Primary Examiner* — Eric Keasel
(74) *Attorney, Agent, or Firm* — Hoffmann & Baron, LLP

(57) ABSTRACT

A solenoid valve includes a manually operable override with a latch handle that comprises a profile for, in a latched position, latching a valve core by having the profile block an operator part of the valve core in a longitudinal direction, and that is biased towards its latched position, preferably by means of gravitational forces acting upon it. The profile includes a recessed hook portion for, in an unlatched position, abutting sideways against the operator part for limiting the latch handle to move towards its latched position. A release handle is movably connected to the latch handle from a starting towards a release position for forcing the operator part to slide along the hook portion in the longitudinal direction until it no longer abuts sideways against the operator part and releases the biased latch handle.

13 Claims, 10 Drawing Sheets

(51) Int. Cl.
*F16K 35/02* (2006.01)
*A62C 35/68* (2006.01)

(56) References Cited

U.S. PATENT DOCUMENTS

| | | | | |
|---|---|---|---|---|
| 5,967,186 A | * | 10/1999 | Grueninger | ......... F16K 31/0627 |
| | | | | 137/625.65 |
| 8,997,536 B2 | * | 4/2015 | Fuller | ..................... F16K 35/10 |
| | | | | 137/385 |

OTHER PUBLICATIONS

NL Search Report and Written Opinion for corresponding Application No. NL 2020721, dated Dec. 10, 2018, 9 pages.

\* cited by examiner

SOLENOID VALVE WITH MANUAL OVERRIDE FUNCTIONALITY THAT HAS COOPERATING LATCH AND RELEASE HANDLES

CROSS-REFERENCE TO RELATED APPLICATIONS

This application claims the benefit of Netherlands Application No. 2020721, filed Apr. 5, 2018, the contents of which is incorporated by reference herein.

FIELD OF THE INVENTION

The invention relates to a solenoid valve, for example for use in a fire sprinkler system, that comprises a valve core which is controllably moveable under the influence of biasing and/or electromagnetic forces, which valve further comprises a manual override functionality via which the valve core can be moved towards a desired position independent of any possible biasing and/or electromagnetic forces acting upon the valve core at the same time.

BACKGROUND OF THE INVENTION

Solenoid valves with overrides are already known in a number of variants. The overrides are mostly acting upon some kind of operator pin which, from a position outside the valve housing, can be manually forced inwards in order to displace the valve core towards another aimed position. Thus the override functionality can be used to override the operation of for example a biasing spring and/or a solenoid. This may be required when a system is being installed which comprises one or more of such solenoid valves for control of medium flow in case a particular event or situation is detected. In case of a fire sprinkler system, the medium flow for example can be water that needs to get distributed towards and dispensed by a large number of sprinklers in order to get a detected fire extinguished as quickly as possible. The override then makes it possible to not only electrically but also manually control the solenoid valves. In case of fire this may be important when the fire is detected earlier by a person than by a smoke sensor or the like. It may however also be crucial in case a power supply to the solenoid valve would not or no longer function.

In the market a direct acting solenoid valve is known under the name "Maxseal ICO4S". This solenoid valve is of a direct acting 3/2-way valve type and has a housing with an inlet, outlet and exhaust port alongside a bore between which a valve core is movable up and down. The valve core is spring biased towards its lower position in which it closes off an inlet passage between the inlet and outlet port while opening an exhaust passage between the outlet and exhaust port. The valve core is equipped with a downwardly extending override operator part that projects to outside the housing. A solenoid is provided on top of the housing. Energizing the solenoid effects in the valve core getting pulled upwards against the action of the spring towards its upper position in which it opens the inlet passage while closing off the exhaust passage. At its lower side the housing is equipped with an automatic latching lever. This lever is rotatable around a horizontal axis between a sideways extending reset position and a downwards hanging open position. The lever comprises a hand grip portion that extends away from the rotation axis in one direction, and a portion with a profile at its other side. The profile rests against a free head end of the operator part and is curved with a gradually increasing radius relative to the rotation axis. This radius is gradually increasing such that, when the latch lever is manually rotated towards its downwards hanging open position, it gradually forces the operator part upwards while moving the valve core towards its upper position. The hand grip portion is dimensioned such heavy relative to the portion with the profile that it biases the latch lever by means of gravity towards its downwards hanging open position.

When the solenoid is de-energized and the latch lever is in reset position, the latch lever exercises its gravity induced biasing force via the profile onto the operator part and thus on the valve core. The valve core however will not be lifted by this force as long as the biasing force of the spring, that also acts on the valve core but then in the opposite direction, is larger than the gravity induced biasing force of the lever. When the solenoid however is energized, it will pull the valve core to its upper position and thus allow the latch lever to automatically drop to its open position. In this open position the profile latches the valve core in its upper position. Even when electrical supply to the solenoid then would be lost, this would force the valve core to remain in its upper position. The solenoid valve then can only be reset by manually rotating the latch lever back to its reset position again.

A disadvantage with this known solenoid valve is that its functioning leaves to be desired. For example the valve is susceptible to getting partially opened due to vibrations or sudden movements acting on the latch lever. Also the latch lever is prone to getting unintentionally manually operated leading to a partial opening. Further it is noted that a heavy spring needs to be provided for biasing the valve core towards its lower position. This is necessary because otherwise the gravity induced biasing force of the latch lever would not sufficiently and reliably be counteracted and could lead to an undesired premature (partial) opening of the valve. However, the heavy spring also makes it necessary to provide a strong solenoid, that otherwise would not be able to pull the valve core upwards against the action of the heavy spring. Furthermore, the heavy spring makes it harder to manually operate the latch lever when such an overriding is desired. This could lead to a situation in which some persons would not be strong enough to perform a manual operation of the override functionality. In addition it is noted that a set screw and locking nut are required in this known valve as operator part in order to make a fine-tuning possible of the latch lever action, which fine-tuning is deemed to be required because of machining tolerances. Finally it is noted that assembly and installation are time-consuming because of the fine-tuning that needs to take place.

SUMMARY OF THE INVENTION

The invention aims to overcome the abovementioned disadvantages at least partly and/or to provide a usable alternative. In particular the invention aims to provide a reliable and user-friendly override functionality for a solenoid valve which can easily and quickly be operated for switching to an operational phase under all kinds of circumstances, including circumstances that the power supply gets cut off.

This aim is achieved by a solenoid valve according to the present invention. The valve comprises a valve housing with an inlet port and outlet port and a flow passage extending there between. A valve core is moveable in a longitudinal direction between a first position and second position to control medium flow between the ports. The valve core is biased towards its first position, and comprises an operator part. A solenoid is provided that is associated with the valve core for moving the valve core towards its second position in dependence of the solenoid being energized. A manually operable override is provided with a latch handle that is movable between an unlatched position and latched position. The latch handle comprises a profile for, in the latched position, latching the valve core in its second position by having the profile block the operator part in the longitudinal direction. The latch handle is biased towards its latched position, preferably by means of gravitational forces acting upon it. According to the inventive thought the profile comprises a recessed hook portion for, in the unlatched position of the latch handle, abutting sideways against the operator part for limiting the latch handle to move towards its latched position. The override further comprises a release handle that is movably connected to the latch handle from a starting position towards a release position for forcing the operator part to slide along the hook portion in the longitudinal direction until the hook portion no longer abuts sideways against the operator part and releases the biased latch handle to automatically start moving or manually get moved towards its latched position.

Advantageously the biasing force acting upon the latch handle now has gotten isolated from the valve core. The hook portion in the profile on the latch handle prevents that the biasing force of the lever can result in a force in the longitudinal direction on the valve core, instead it is diverted in a lateral force on its operator part. Thus the valve has gotten fully insusceptible to unintended (partial) operation due to vibrations or sudden movements. The release handle forms a release function for the latch handle that is well able to efficiently protect against unintentional manual operation of the valve. Yet the profile with the hook-portion still makes it possible for the latch handle to automatically move towards its latched position as soon as the solenoid has been operated to switch the valve. The valve can be assembled easily and fast because there is no need to fine tune the override functionality.

The latch handle can be designed in various ways, for example as a slide that is moveable and biased in the sideways direction, and that is provided with a stepped profile of which the recessed hook portion can lie biased sideways against the operator part in the unlatched position. The release handle then can be provided as a push button that is movable in the longitudinal direction for temporarily forcing the operator part to slide along the recessed hook portion until it releases the slide to start moving towards its latched position and there latch the valve core in its second position.

In a preferred embodiment however, the latch handle can be rotatable between its unlatched and latched positions around a first axis, and the release handle can be rotatable relative to the latch handle between its starting and release positions around a second axis. The advantage hereof is that it makes a smooth manual operation possible by means of a one-handed uninterrupted rotational force getting exerted upon firstly only the release handle and subsequently upon both the release and latch handle.

In a further embodiment the profile then may comprise a part-circular portion with a constant radius that is slidable along a head end of the operator part during rotation of the latch handle around its first axis while having the part-circular portion of the profile block the operator part in the longitudinal direction. Thus, it is guaranteed that the valve core must firstly be fully switched to its second position, either by means of the solenoid either by means of the release handle, before the latch handle can start rotating towards its latched position. This helps to prevent that the valve only gets switched partially. Furthermore it maximizes the protection against unintended operation, for example due to vibrations or sudden movements acting on the latch handle.

The latch handle and release handle can be formed by rotatable knobs. Preferably however they may comprise a latch lever that is rotatable around the first axis, and a release lever that is rotatable around the second axis. Depending on their dimensions and weights, the levers can easily provide for light manual operation and large gravity induced biasing forces acting upon them.

The profile with its hook portion then can be provided at a free end of the latch lever, wherein a free end of the release lever projects into the hook portion. Thus a simple and efficient construction is obtained.

The latch lever and/or release lever preferably are positioned such that they mainly extend perpendicularly to the longitudinal direction when the latch lever is in the unlatched position, and such that they mainly extend in line with the longitudinal direction or at a small angle with the longitudinal direction (0-10 degree) when the latch lever is in the latched position. Preferably the longitudinal direction of the valve is vertical such that, in the unlatched position of the latch lever, the latch lever and/or release lever extends mainly in a horizontal direction, and, in the latched position of the latch lever, the latch lever and/or release lever extends mainly in the vertical direction. Thus the gravity induced bias of the latch lever can automatically be achieved without additional measures having to be taken. Furthermore, it provides for a high visibility of the valve's switching condition because of the large 80-90° angle travel between the unlatched and latched positions.

The release lever can be positioned such that it at least partly covers the latch lever. Thus it is prevented that a person can get injured between the latch and release levers. Furthermore it makes it immediately clear for the person that he only needs to operate the release lever. The release lever then can be given a distinctive signaling color, like red or fluorescent.

In a preferred embodiment a spring is provided between the latch handle and release handle for biasing the release handle towards its starting position relative to the latch handle. In the alternative the biasing force upon the valve core can also be used for biasing the release handle towards its starting position relative to the latch handle.

The solenoid valve can be of all kinds of types and be used for all kinds of systems. Preferably it is a direct operated, balanced poppet, 3/2-way, universal valve. Advantageously the solenoid valve then also has an exhaust port and an exhaust passage extending between the outlet port and the exhaust port, wherein the valve core is moveable between its first and second end positions to sealingly engage a respective one of two different seats. Thus the solenoid valve with auto latching handle and manual override can be used as indirect acting pilot/booster valve for operating another larger valve.

Further preferred embodiments of the solenoid valve are stated in the dependent sub claims.

The invention also relates to a sprinkler system.

BRIEF DESCRIPTION OF THE DRAWINGS

The invention shall be explained below in more detail with reference to the accompanying drawings, wherein.

DETAILED DESCRIPTION OF THE INVENTION

Figure 1:
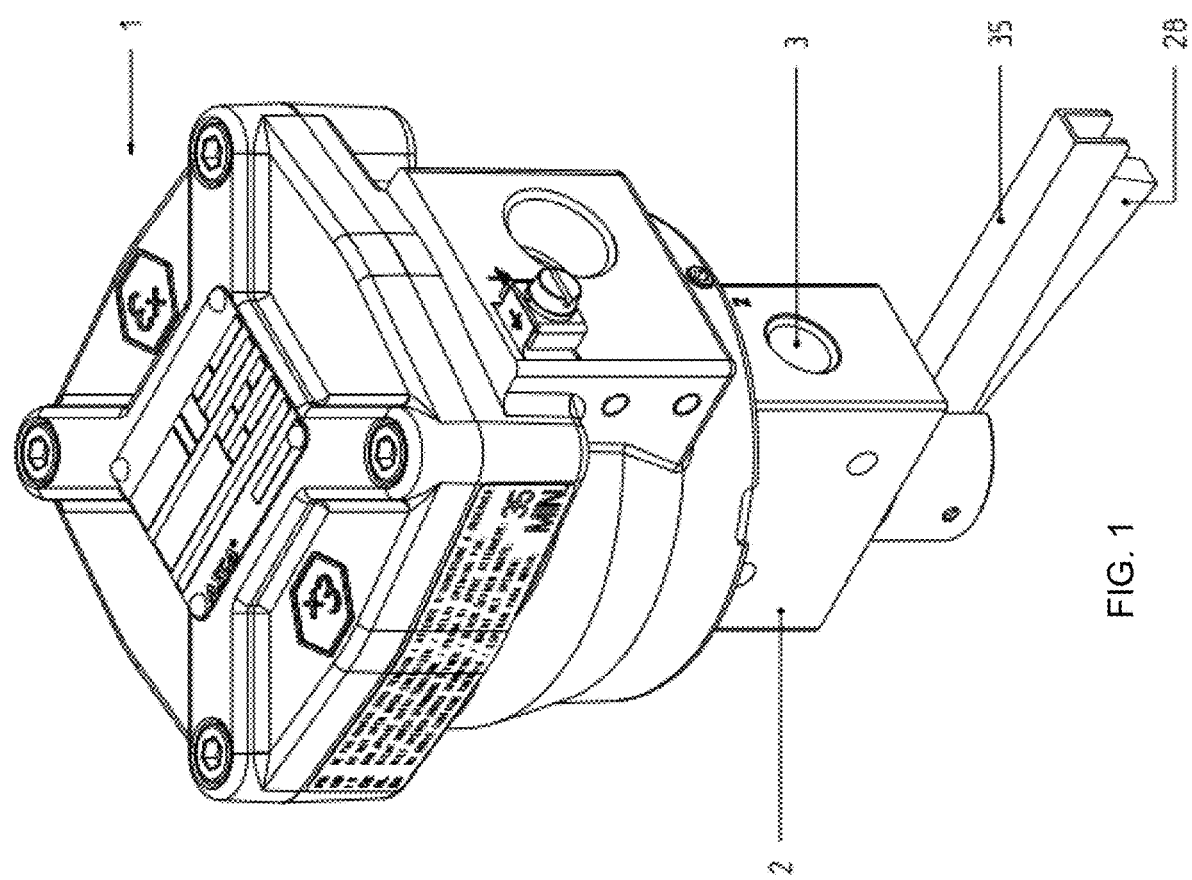
FIG. 1 shows a perspective view of a preferred embodiment of the auto latching solenoid valve according to the invention.
Figure 2:
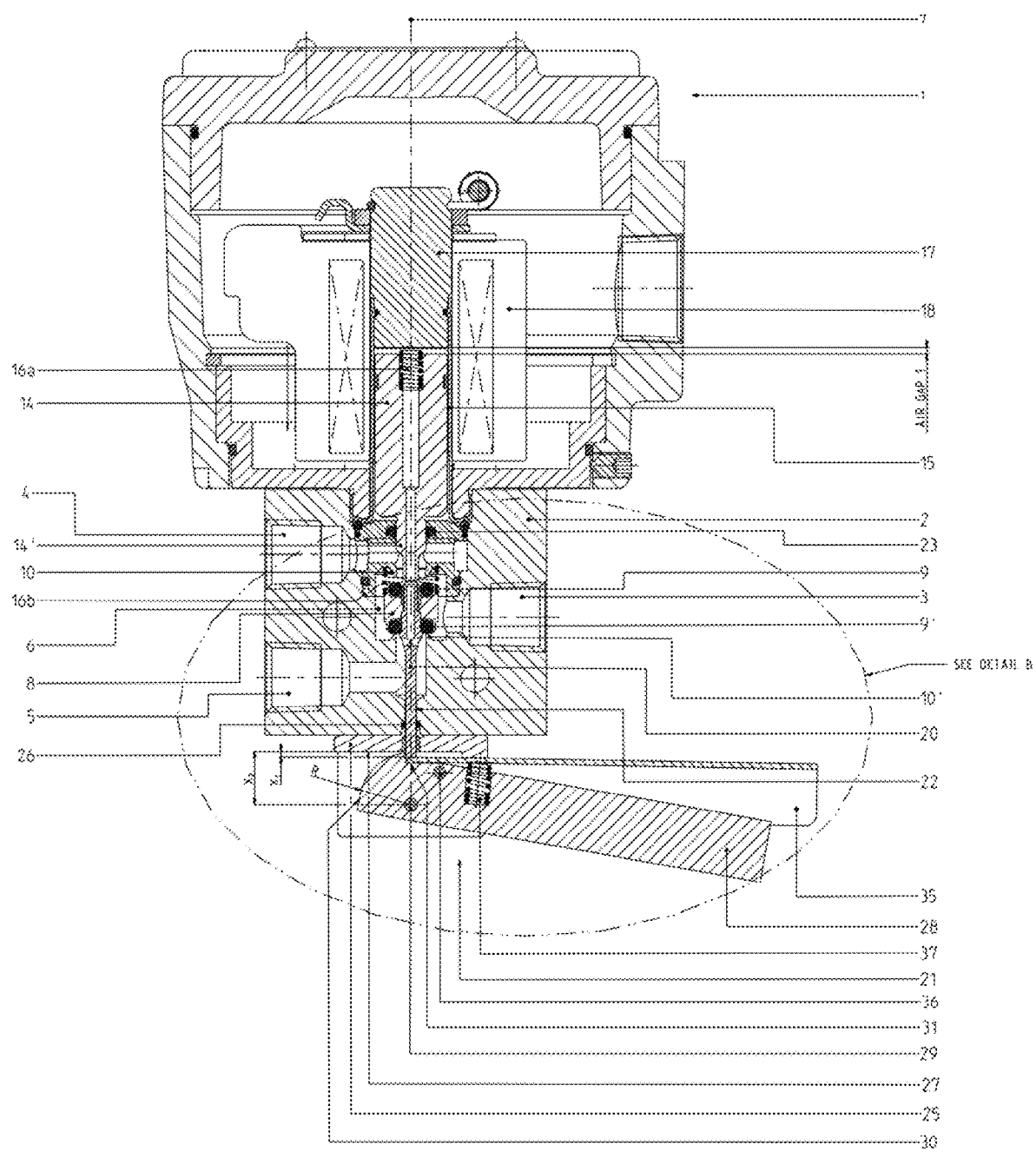
FIG. 2 shows a cross-sectional view of FIG. 1.
Figure 3:
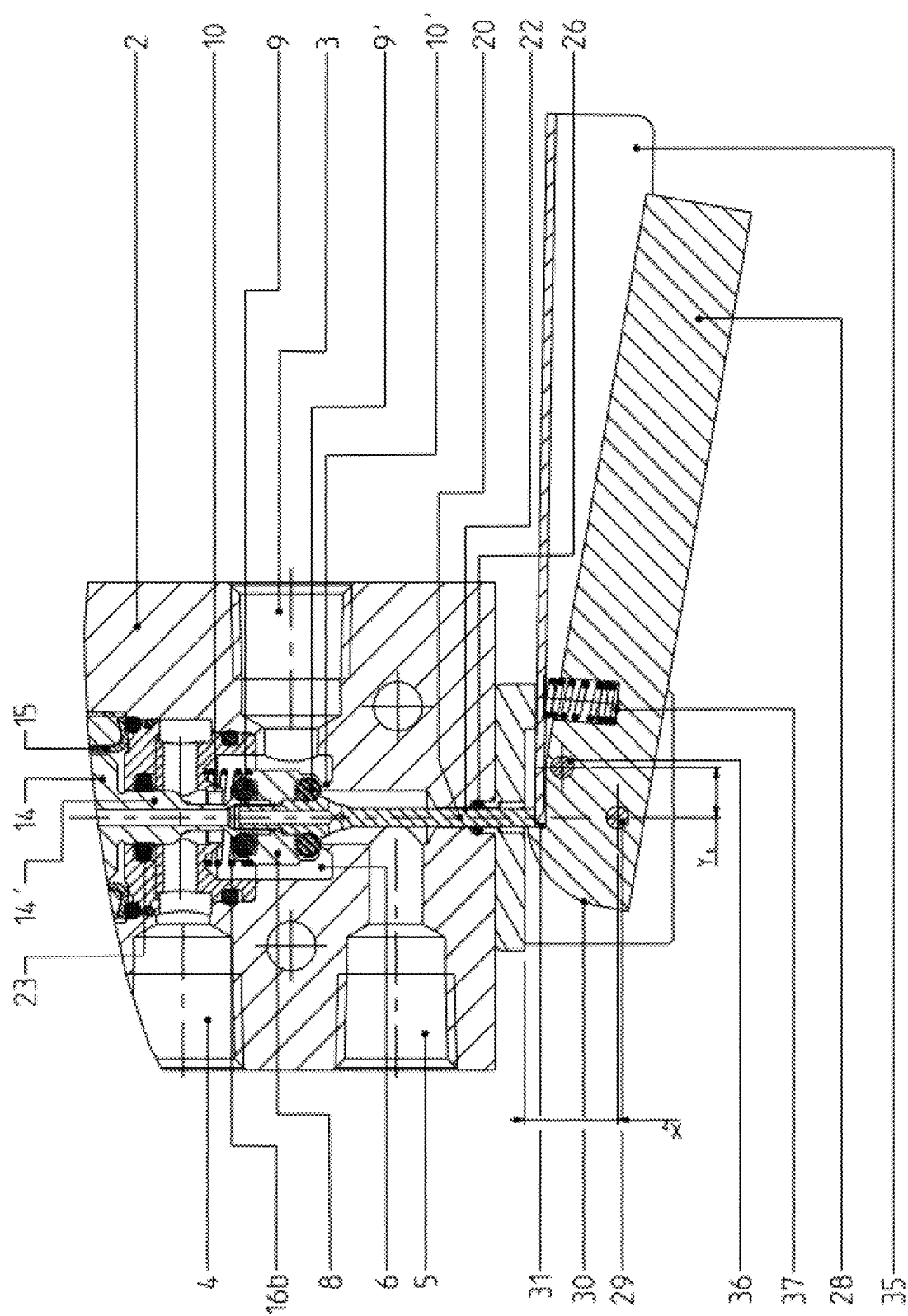
FIG. 3 shows an enlarged partial view of detail A in FIG. 2.
Figure 4:
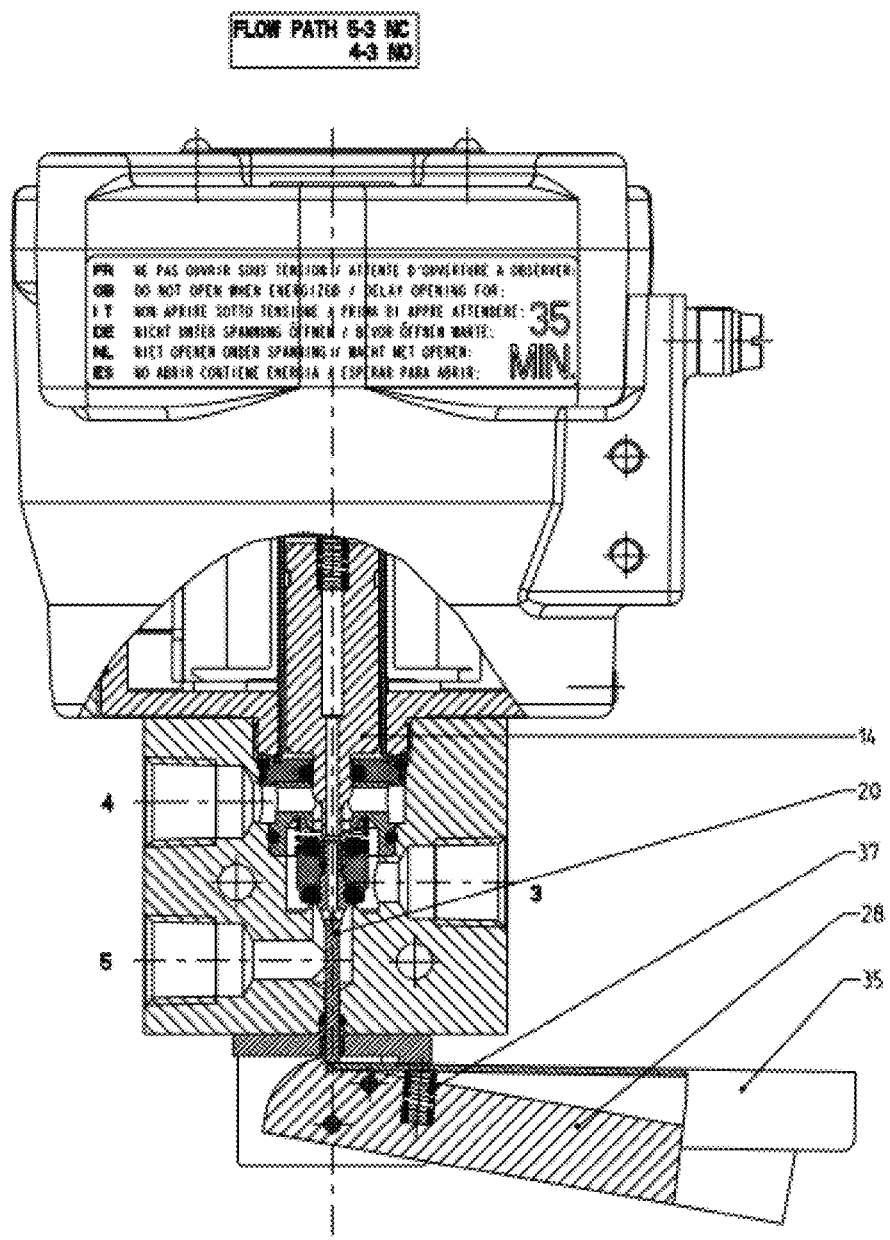
FIG. 4 shows a de-energized situation with the release lever in its starting position and the latch lever in its unlatched position.

In FIG. 1 the solenoid valve has been given the reference numeral 1. The valve 1 comprises a valve housing 2 with ports 3, 4, 5. The ports may perform differing functions in dependence of the valve being closed or opened. For example in a so-called normally closed position NC, port 5 may form an inlet port, whereas port 3 may form an outlet port and port 4 may form an exhaust port. In another example the valve can be operated in two directions and the port 3 then may form an inlet port, whereas the ports 4 and 5 form respective outlet ports.

In the here shown example however a so-called normally open position NO is foreseen in which port 3 forms an outlet port, whereas port 4 forms an inlet port and port 5 forms an exhaust port.

Figure 5:
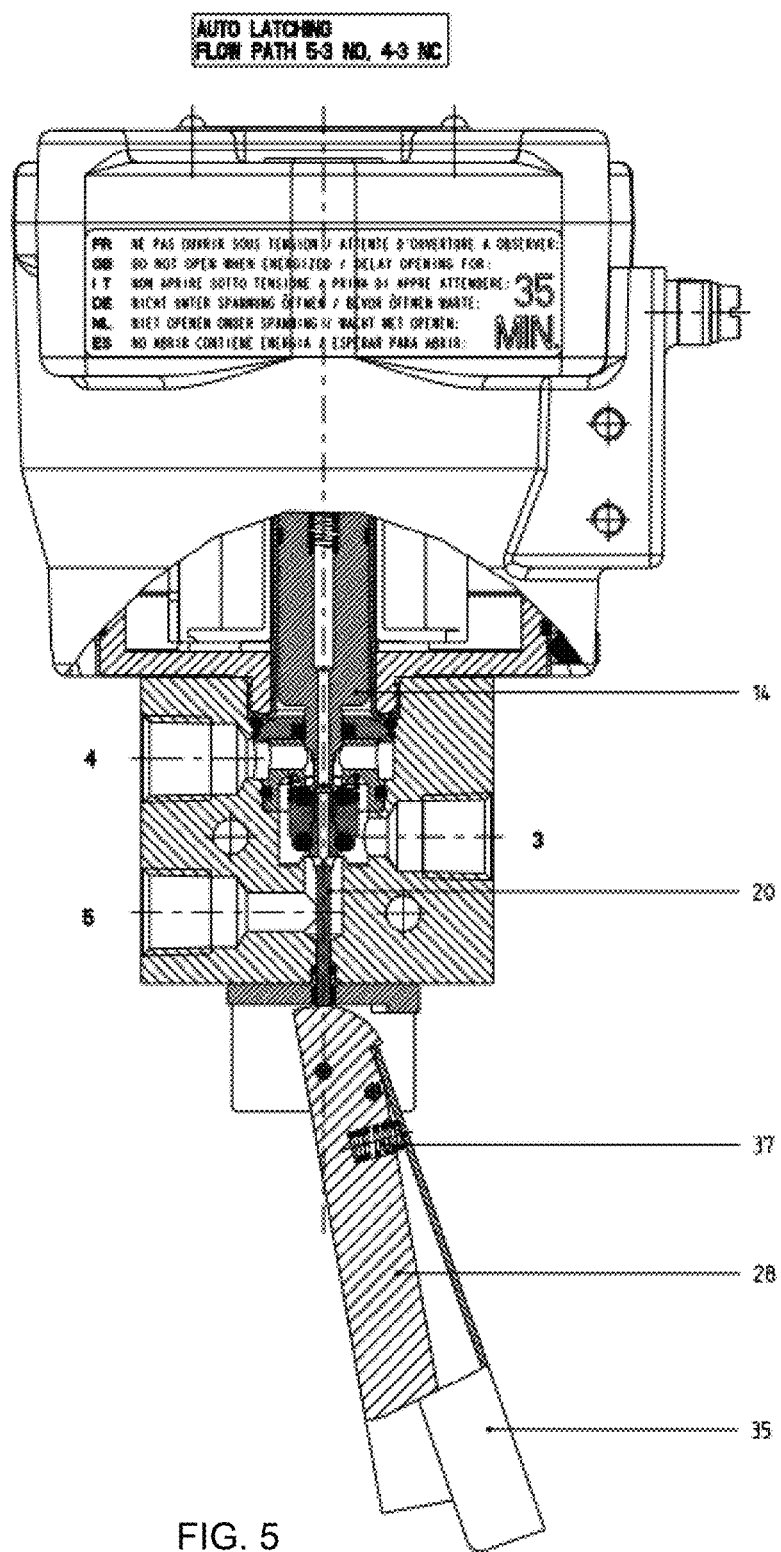
FIG. 5 shows the energized situation with the latch lever together with the release lever having automatically dropped down towards its unlatched position.
Figure 6:
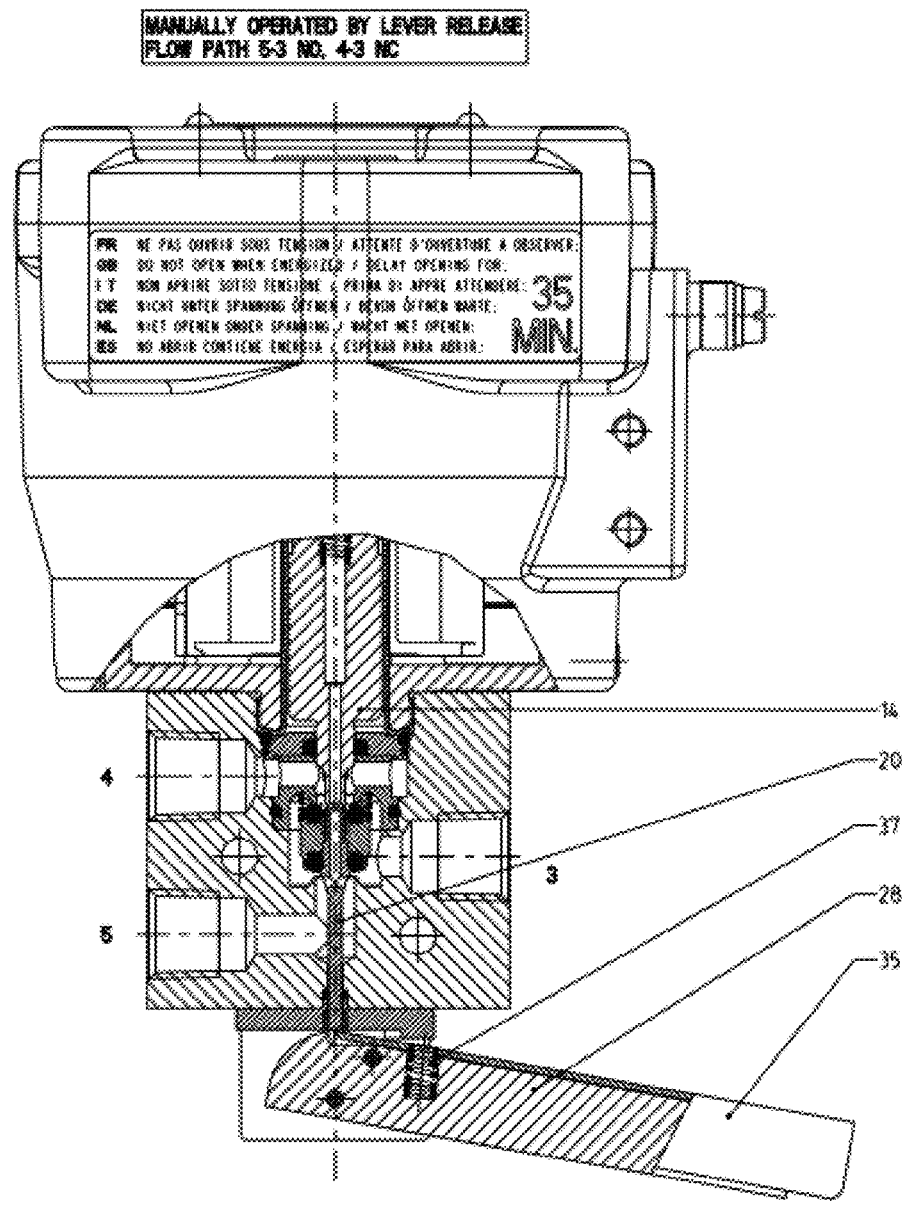
FIG. 6 shows the de-energized situation with the latch lever in its unlatched position and the release lever having been manually pushed downwards towards its release position.
Figure 7:
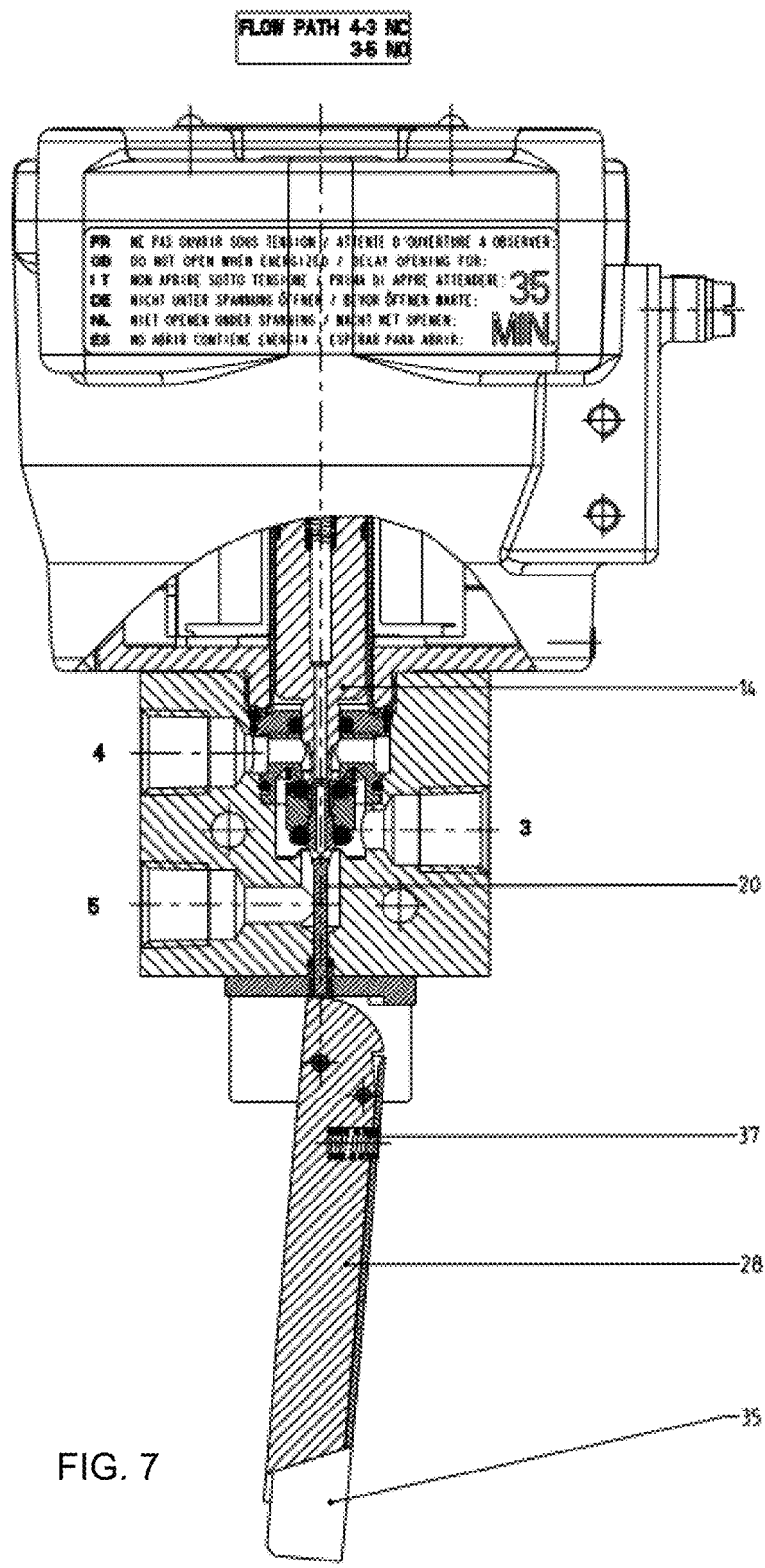
FIG. 7 shows the de-energized situation with the release lever having been manually pushed further downwards while having taken along the latch lever towards its unlatched position.

A bore 6 extends in a longitudinal direction 7 through the housing 2 and connects at respective positions to the ports 3-5. A valve core 8 is movable in the longitudinal direction 7 through the bore 6 between a first lower (starting) and second upper (end) position. The valve core 8 comprises two sealing rings 9, 9' which in the first lower and second upper position can come to lie sealing against complementary seats 10, 10' which delimit respective openings of the bore towards the respective ports 4, 5. In the first lower position, which is shown in FIG. 1-4, the valve core 8 brings the outlet port 3 in flow communication with the inlet port 4 and at the same time closes the outlet port 3 off from the exhaust port 5. In the second upper position, which is shown in FIG. 5-7, the valve core 8 brings the outlet port 3 in flow communication with the exhaust port 5 and at the same time closes the outlet port 3 off from the inlet port 4.

The valve core 8 is fixedly connected to a stem part of a solenoid core 14. The solenoid core 14 is moveably guided in the longitudinal direction 7 inside a cylindrical sleeve 15 which is connected fixed and sealing to the housing 2. The solenoid core 14 and valve core 8 are biased towards the first lower position by means of springs 16a and 16b. Above the solenoid core 14 an electrically magnetisable solenoid base 17 is provided which is fixedly connected to the sleeve 15. The solenoid core 14 and solenoid base 17 form part of a solenoid 18. If the solenoid 18 is fed with electricity, the base 17 gets magnetised and starts to exert an upwards pulling force to the solenoid core 14, and thus is able to move the solenoid core 14 together with the valve core 8 connected thereto, towards the second upper position. Thus the valve core 8 can be moved from its first lower position towards its second upper position. As soon as the solenoid 18 is no longer energized, the core 14 no longer shall be attracted by the base 17 and the spring 16b can cause the core 14 and valve core 8 to be pushed back to the first lower position again.

The valve core 8 is provided with an operator part 20 for cooperating with a manually operable override 21. The operator part 20, that here is formed by a slender locking pin, for that reason is fixedly connected to a lower side of the valve core 6. The operator part 20 is moveably guided in the longitudinal direction 7 through a cylindrical opening 22 in the housing 2. Since the solenoid core 14 and the valve core 8 are biased towards the first lower position by means of the spring 16b, the operator part 20 is also biased towards this first lower position, that is to say, in the situation shown, downwards in the longitudinal direction 7.

The solenoid 18 is sealingly mounted to the valve housing 2 by means of suitable sealing connections. With this the movable core 14 of the solenoid 18 is sealed relative to the bore 6 by means of a sealing ring 23 through which a piston part 14' of the core 14 is guided. Thus any pressurized medium, like fluids or gasses, cannot escape from the valve 1 via the solenoid 18.

The override 21 comprises a base 25 that is fixedly connected to the housing 2 directly underneath the position of the cylindrical opening 22. This base 25 is provided with a supplementary cylindrical opening that lies in line with the cylindrical opening 22 in the housing 2. The operator part 20 is moveably guided in the longitudinal direction 7 through this supplementary opening. Between the base 25 and the housing 2 a sealing ring 26 is provided through which the operator part 20 is movably guided in the longitudinal direction 7. Thus any pressurized medium, like fluids or gasses, can also not escape from the valve 1 via the override 21.

The base 25 and the operator part 20 are dimensioned such that in the first lower position a free end portion of the operator part 20 projects downwards outside a lower side 27 of the base 25 with a length X1, and dimensioned such that in the second upper position the free end portion of the operator part 20 no longer projects downwards to outside said lower side 27 of the base 25.

The override 21 further comprises a latch lever 28 that is rotatable relative to the base 25 around a first axis 29 between a so-called sideways extending unlatched position (FIG. 1-4) and a downwardly extending latched position (FIG. 5). The first axis 29 extends perpendicular to the longitudinal direction 7 while crossing it at a distance X2 from said lower side 27 of the base 25.

In the unlatched position of FIG. 1-4, the latch lever 28 is unbalanced around the first axis 29 in that it is biased towards its latched position owing to gravitational forces acting on the latch lever 28. For this the latch lever 28 comprises a short portion 28a and a long portion 28b at opposing sides of the first axis 29. This effects in that, in the unlatched position, the latch lever 28 has a larger weight at the side of its long portion 28b, in the drawing the right side portion, than at the side of its short portion 28a, and thus has a tendency cq is biased to start rotating clockwise from its unlatched position towards its latched position.

The latch lever 28, here at its short portion 28a, comprises a part-circular profile portion 30 with a constant radius R that substantially corresponds to the distance X2. The part-circular profile portion 30 is delimited at its clockwise end side by a recessed hook profile portion 31. In the unlatched position of the latch lever 28, the hook profile portion 31 abuts sideways against the free end portion of the operator part 20 that projects downwards outside the lower side 27 of the base 25. This prevents the latch lever 28 to start rotating towards its latched position.

The override 21 further comprises a release lever 35 that is manually rotatable relative to the latch lever 28 around a second axis 36 between a so-called starting position (FIG. 1-5) and a downwardly pressed release position (FIGS. 6 and 7). The second axis 36 extends perpendicular to the longitudinal direction 7 without crossing it but lying at a distance Y1 sideways therefrom. The release lever 35 comprises a short portion 35a and a long portion 35b at opposing sides of the second axis 36. The release lever 35 is biased by a spring 37 away from the latch lever 28. The short portion 35a extends to into the hook profile portion 31 and there abuts in the longitudinal direction 7 against the free end portion of the operator part 20 that projects downwards outside the lower side 27 of the base 25. The bias of the spring 37 prevents the release lever 35 to start rotating towards its downwardly pressed release position. The spring 37 also prevents the lever 35 of touching the operator part 20 in the unlatched starting position. A small gap then prevents interference in the longitudinal direction 7.

The long portion 35b of the release lever 35 is designed somewhat longer than the latch lever 28, and such that it at least partly covers the latch lever 28. For this the release lever 35 has been given a downwardly open U-shape that fits rotatable over a beam-shape of the latch lever 28.

Electrically Initiated Method of Operation:

Starting from the de-energized position as shown in FIG. 1-4, the solenoid 18 can be fed with electricity. This shall move the valve core 8 together with the operator part 20 towards the second upper position while sliding upwards along the hook profile portion 31 in the longitudinal direction 7 until the hook profile portion 31 no longer abuts sideways against the operator part 20. As soon as the second upper position is reached, the free end portion of the operator part 20 no longer projects downwards outside said lower side 27 of the base 25. This results in the hook profile portion 31 no longer abutting sideways against the free end portion of the operator part 20. The latch lever 28 then has the freedom to automatically start rotating towards its latched position, merely under the influence of gravity. No additional manual force is necessary for this.

This automatically latched situation is shown in FIG. 5. There it can be seen that the latch and release levers 28, 35 together have dropped down to a substantially vertically downwardly hanging position. During this rotation of the latch lever 28 towards its latched position, the part-circular profile portion 30 has slid along the head end of the free end portion of the operator part 20. The part-circular profile portion 30 then blocks the operator part 20 in the longitudinal direction 7 to remain in its second upper position even in the case that the solenoid 18 is no longer energized and for as long as the latch lever 28 remains to hang downwards in its latched position.

Only in the case that the latch lever 28 has gotten manually moved back upwards towards its unlatched position, while at the same time the solenoid 18 is no longer energized, the valve core 8 shall have the freedom to start moving back to its first lower position again by means of the biasing force of the spring 16b.

Manually Initiated Method of Operation:

Starting from de-energized position as shown in FIG. 1-4, the valve 1 can also be manually operated via the override 21. For that the release lever 35 can be manually pushed downwards towards its release position relative to the latch lever 28. This forces the operator part 20 to move the valve core 8 towards its second upper position while sliding upwards along the hook profile portion 31 in the longitudinal direction 7 until the hook profile portion 31 no longer abuts sideways against the operator part 20. As soon as the second upper position is reached, the free end portion of the operator part 20 no longer projects downwards outside said lower side 27 of the base 25. This results in the hook profile portion 31 no longer being able to abut sideways against the free end portion of the operator part 20.

This manually released situation is shown in FIG. 6. There it can be seen that in the release position the long portion 35b of the release lever 35 has come to rest against the long portion 28b of the latch lever 28. It is then possible to manually further push the release lever 35 down while pushing along the latch lever 28 with it towards its latched position.

Figure 8:
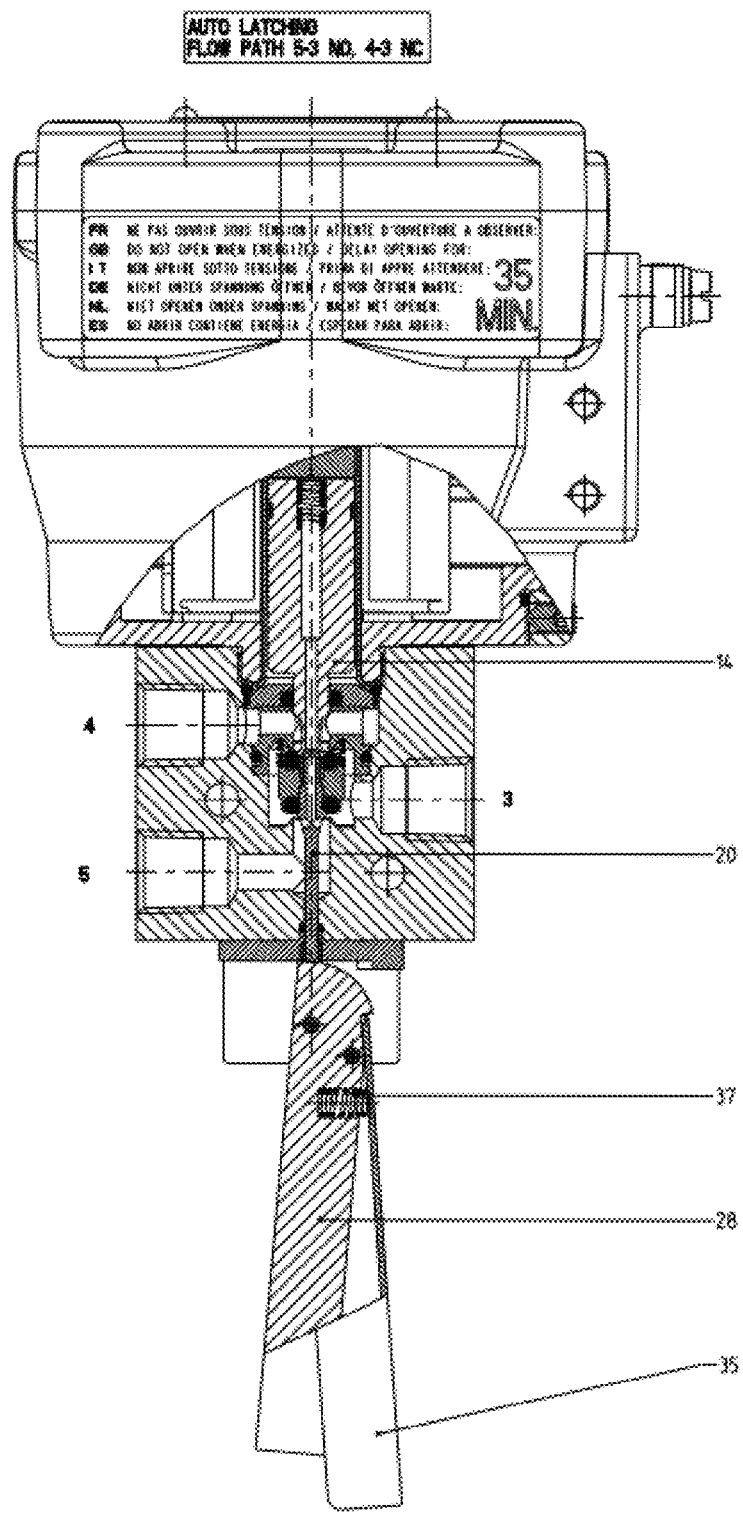
FIG. 8 shows the view of FIG. 7 with the release lever having been released again.

This manually latched situation is shown in FIG. 7. There it can be seen that the latch and release levers 28, 35 together have been manually rotated down to the substantially vertically downwardly hanging position. During this rotation of the latch lever 28 towards its latched position, the part-circular profile portion 30 has slid along the head end of the free end portion of the operator part 20 and thus the part-circular profile portion 30 has gotten to block the operator part 20 in the longitudinal direction 7 to remain together with the valve core 8 in its second upper position. As soon as the manual pushing force is then taken away, the release lever 35 shall be moved back by the spring 37 towards its starting position relative to the latch lever 28. This situation is shown in FIG. 8. There it can be seen that the latch and release levers 28, 35 together have been rotated down to a substantially vertically downwardly hanging position Like in FIG. 5, in this situation also the valve core 8 shall only have the freedom to start moving back to its first position again by means of the biasing force of the spring 16B, in the case that the latch lever 28 gets manually moved back towards its unlatched position, while at the same time the solenoid 18 may not all of a sudden have gotten energized.

Figure 9:
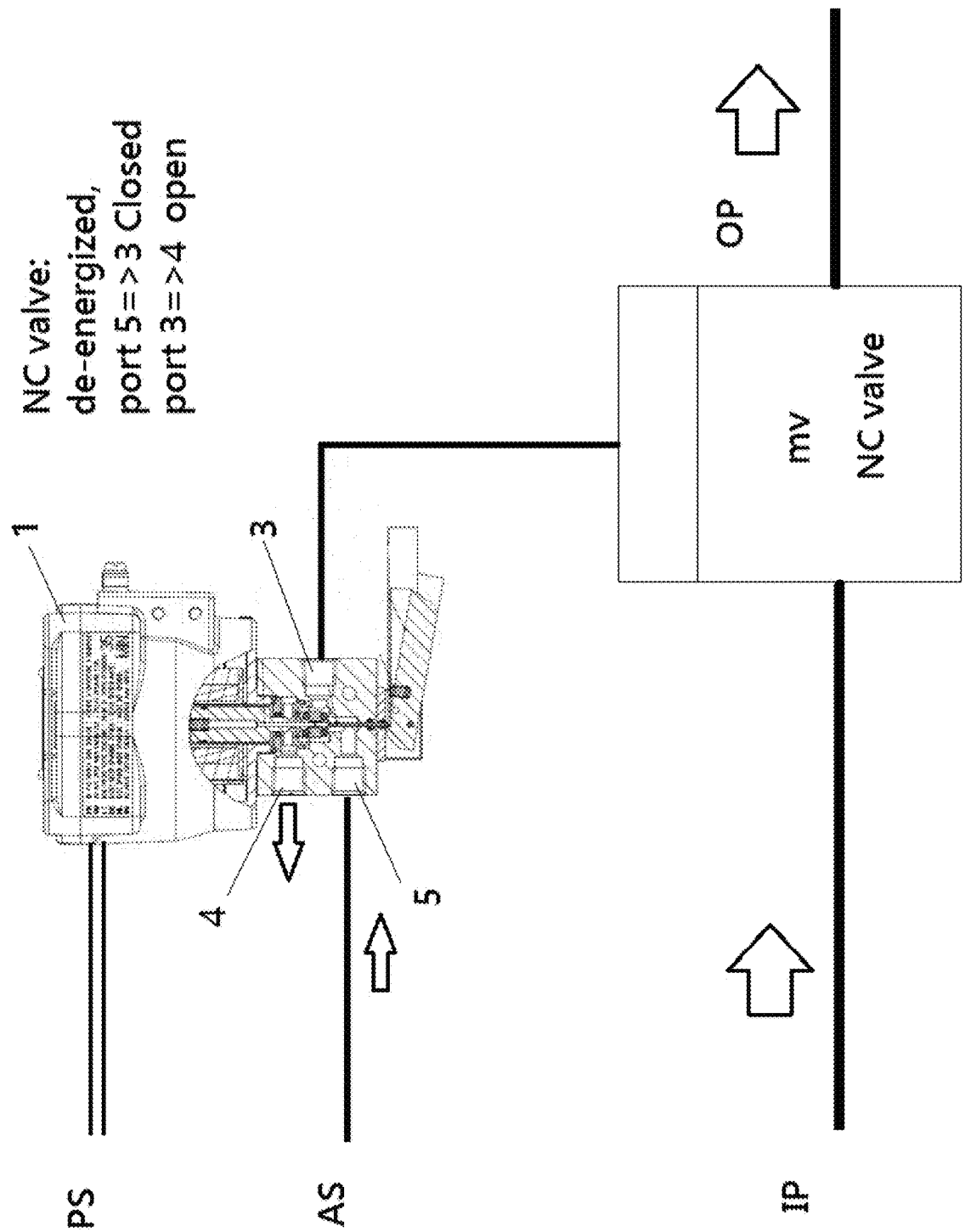
FIG. 9 shows a schematic view of the solenoid valve forming part of a normally closed sprinkler system.

The above shown and described solenoid valve 1 can be used for all kinds of purposes. FIG. 9 shows a use of the solenoid valve 1 as indirect acting pilot valve for operating a main valve MV in a sprinkler system, preferably a water sprinkler system for extinguishing fire. The port 5 of the pilot valve 1, that here forms an inlet port, is connected to an air supply AS, whereas the outlet port 3 of the pilot valve 1 is connected to the main valve MV.

The main valve MV comprise an inlet port IP that is connected to a water supply, and an outlet port OP that is connected to a plurality of sprinkler heads of the water sprinkler system. The main valve MV here is a normally closed NC pilot operated 2-2 spring return valve.

In the normally closed state NC with inlet pressure on port 5 of the pilot valve 1 in which its solenoid is de-energized, the main valve MV then does not have an operator pressurized with air via the outlet port 3 of the pilot valve 1. Instead, the outlet port 3 of the pilot valve 1 is connected to the exhaust port 4, such that environmental pressure is present between the pilot valve 1 and the main valve MV.

In case of fire a detection unit like a smoke sensor will send out a signal for supplying power to the solenoid 18 of the pilot valve 1 via a power supply PS. This will move the valve core 8 to its second upper position in which it connects the inlet port 5 with the outlet port 3 such that pressurized air gets supplied towards the main valve MV. When the solenoid 18 moves the valve core 8 to its second upper position, the operator part 20 that is connected thereto will also move towards its second upper position. This releases the latch lever 28. The biased latch lever 28 then shall automatically drop down towards its latched position and will keep the valve core 8 in the second upper (open) position even when the electrical supply to the solenoid 18 is lost. This can be crucial when the fire for example destroys the power supply PS. The pilot valve 1 can only be reset (closed) again when it is de-energized and manually unlatched. Until that has happened, water shall remain getting dispensed via the various sprinkler heads of the sprinkler system.

The pressurized air flow coming out of the opened outlet port 3 thus gets used to open the main valve MV of the system which then sends water to the various interconnected sprinkler heads. Thus it can be guaranteed that the sprinkler heads shall automatically start to spray water as soon as fire is detected and shall keep on doing so even if the electrical supply gets lost. At the same time the pilot valve 1 can also be manually operated. This can for example be necessary when someone sees fire before the detection unit has even detected it. To do manual operation the release lever 35 must intentionally be pressed down for enough for starting to take the latch lever 28 along. A slight accidental push against the release lever 35 therefore shall not suffice. The pressing down of the levers 28, 35 will move the valve core 8 towards its second upper position until the operator part 20 releases the latch lever 28 after which the latch lever 28 can be manually moved into its latched position in which it blocks the valve core 8 in its second upper position. The main valve MV then has gotten opened and water shall get dispensed via the sprinkler heads. Again, after the detected fire has been put out, the pilot valve 1 can only be reset (closed) again for closing the main valve MV when the pilot valve 1 is still or has become de-energized and manually unlatched. Until that has happened, water shall remain getting dispensed via the various sprinkler heads of the sprinkler system.

Figure 10:
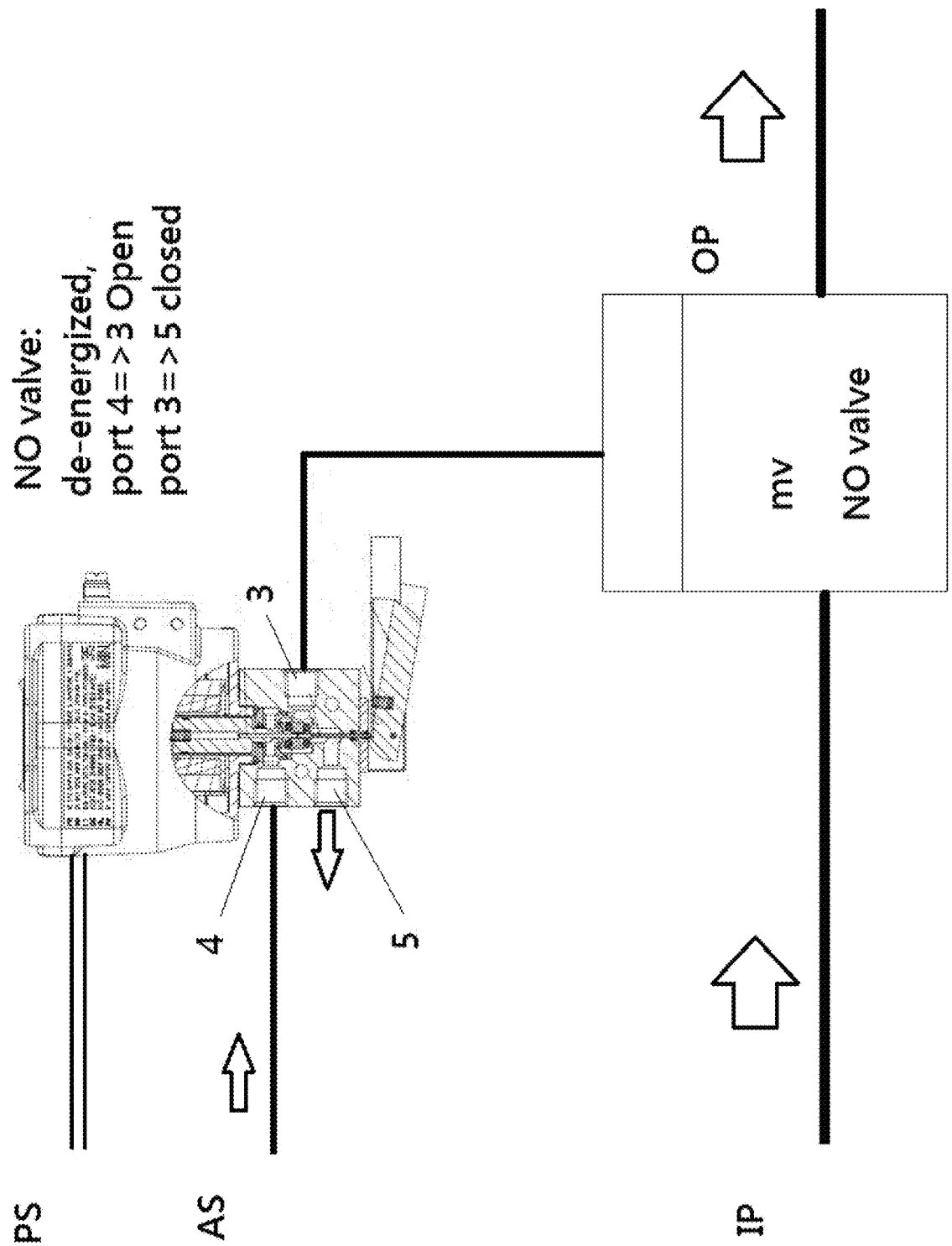
FIG. 10 shows a schematic view of the solenoid valve forming part of a normally open system.

FIG. 10 shows a use of the solenoid valve 1 as indirect acting pilot valve for operating a main valve MV again in a sprinkler system, preferably a water sprinkler system for extinguishing fire. This time port 4 of the pilot valve 1 forms the inlet port, and is connected to the air supply AS. The main valve MV this time however is a normally open NO pilot operated 2-2 spring return valve.

In the normally open state NO (with inlet pressure on port 4) of the pilot valve 1 in which its solenoid is de-energized, the main valve MV then does have its operator pressurized with air via the outlet port 3 of the pilot valve 1 such that the main valve MV is forced in its closed state. At fire the pilot valve 1 then gets energized and latches, causing the pressure to drop at the outlet port because it gets connected to the exhaust port 5. This results in the main valve MV automatically moving towards its normally open state NO.

Besides the embodiments shown numerous variants are possible. For example the various parts can be given different dimensions and can be made out of all kinds of materials. It is also possible to use other types of latch and/or release handles instead of levers. If desired the override functionality can also be used on other types of solenoid valves, like ones having more or less ports. The operator part does not necessarily have to be placed in line with the longitudinal moving direction of the valve core, as long as it is able to exert a pushing force in the longitudinal direction against the valve core. Instead of in a sprinkler system the solenoid valve with override can also be used for other purposes where it is desired to automatically have a valve core blocked in a certain solenoid induced or manually operated switching position.

The normally closed pilot valve and normally closed main valve as shown in FIG. 9 is most suitable in a fire sprinkler system. A fire detection signal results in a power supply towards the pilot valve, causing the normally closed pilot valve to open, resulting in a positive pressure to the main valve causing the normally closed main valve to open, resulting in the fire getting extinguished.

The normally opened pilot valve and normally open main valve as shown in FIG. 10 is also suitable in a fire sprinkler system as a fail-safe solution. A fire detection signal then results in a power supply towards the pilot valve, causing the normally open pilot valve to close, resulting in a pressure drop to the main valve causing the normally open main valve to open, resulting in the fire getting extinguished.

It is noted that the solenoid valve according to the invention can also be applied in other systems, like for example (nuclear) power plants for controlling the power. The power then may increase on increasing a control signal/pressure-against a constant reversed pressure. If the controls fail, the power plant then may automatically get shut down by this constant reversed pressure. Thus a fail safe is obtained.

Instead of providing the latch lever with a part circular profile portion of which the centre of the radius is exactly on the centreline of the longitudinal axis, it is also possible to have the centre of the radius slightly out of centre of the longitudinal axis or in combination with the radius placed eccentrically in the lever. This has the advantage that, in the latched position when the solenoid is de-energized, some force/pressure may get applied by the latch lever onto the operator part, which in turn may result in the valve core getting pressed with some pressure against the corresponding seat in its second position. This may help to prevent leakage over this corresponding seat. The eccentric radius then, under the influence of the gravity acting upon the latch lever, may work as an eccentric clamp helping to also in the manually operated situation and/or after the solenoid has become de-energized, to keep the inlet port 4 of the valve 1 hermetically closed.

Thus according to the invention a multi-functional solenoid valve with auto latch manual override functionality is provided which is safe and reliable during operation while at a same time its handles are well able to give a visual indication of a switched latched position.

The invention claimed is:
1. A solenoid valve comprising:
   a valve housing with an inlet port and outlet port and a flow passage extending there between;
   a valve core that is moveable in a longitudinal direction between a first position and second position to control medium flow between the ports, which valve core is biased towards its first position, and which valve core comprises an operator part;
   a solenoid associated with the valve core for moving the valve core towards its second position in dependence of the solenoid being energized; and a manually operable override with a latch handle that is movable between an unlatched position and latched position, wherein latch handle comprises a profile for, in the latched position, latching the valve core in its second position by having the profile block the operator part in the longitudinal direction, wherein latch handle is biased towards its latched position, wherein the profile comprises a recessed hook portion for, in the unlatched position of the latch handle, abutting sideways against the operator part for limiting the latch handle to move towards its latched position, and wherein the override further comprises a release handle that is movably connected to the latch handle from a starting position towards a release position for forcing the operator part to slide along the hook portion in the longitudinal direction until the hook portion no longer abuts sideways against the operator part and releases the biased latch handle.

2. The solenoid valve according to claim 1, wherein the latch handle is rotatable around a first axis, and wherein the release handle is rotatably connected to the latch handle around a second axis.

3. The solenoid valve according to claim 2, wherein the profile comprises a part-circular portion with a constant radius that is slidable along a head end of the operator part during rotation of the latch handle around its first axis while having the part-circular portion of the profile block the operator part in the longitudinal direction.

4. The solenoid valve according to claim 2, wherein the latch handle comprises a latch lever that is rotatable around the first axis, and wherein the release handle comprises a release lever that is rotatable around the second axis.

5. The solenoid valve according to claim 4, wherein the profile with its hook portion is provided at a free end of the latch lever, wherein a free end of the release lever projects into the hook portion.

6. The solenoid valve according to claim 4, wherein, in the unlatched position of the latch lever, the latch lever and/or release lever is perpendicular to the longitudinal direction, and wherein, in the latched position of the latch lever, the latch lever and/or release lever is in line with the longitudinal direction.

7. The solenoid valve according to claim 6, wherein, in the unlatched position of the latch lever, the latch lever and/or release lever extends in a horizontal direction, and wherein, in the latched position of the latch lever, the latch lever and/or release lever extends in a vertical direction.

8. The solenoid valve according to claim 4, wherein the release lever is positioned such that it at least partly covers the latch lever.

9. The solenoid valve according to claim 1, wherein a spring is provided between the latch handle and release handle for biasing the release handle towards its starting position relative to the latch handle.

10. The solenoid valve according to claim 1, wherein the valve housing further has an exhaust port and an exhaust passage extending between the outlet port and the exhaust port, and wherein the valve core is moveable between its first and second end positions to sealingly engage a respective one of two different seats.

11. The solenoid valve according to claim 1, wherein the operator part is a locking pin that is fixedly connected to the valve core and that, at least in the first position, extends in the longitudinal direction to outside the housing.

12. A sprinkler system comprising a solenoid valve according to claim 1.

13. The sprinkler system according to claim 12, wherein the solenoid valve is used as pilot valve for operating a main valve of the system.

* * * * *